March 1, 1960  D. I. MORRISON ET AL  2,926,474
TUBE CLOSING MACHINE
Filed Jan. 29, 1954  2 Sheets-Sheet 1
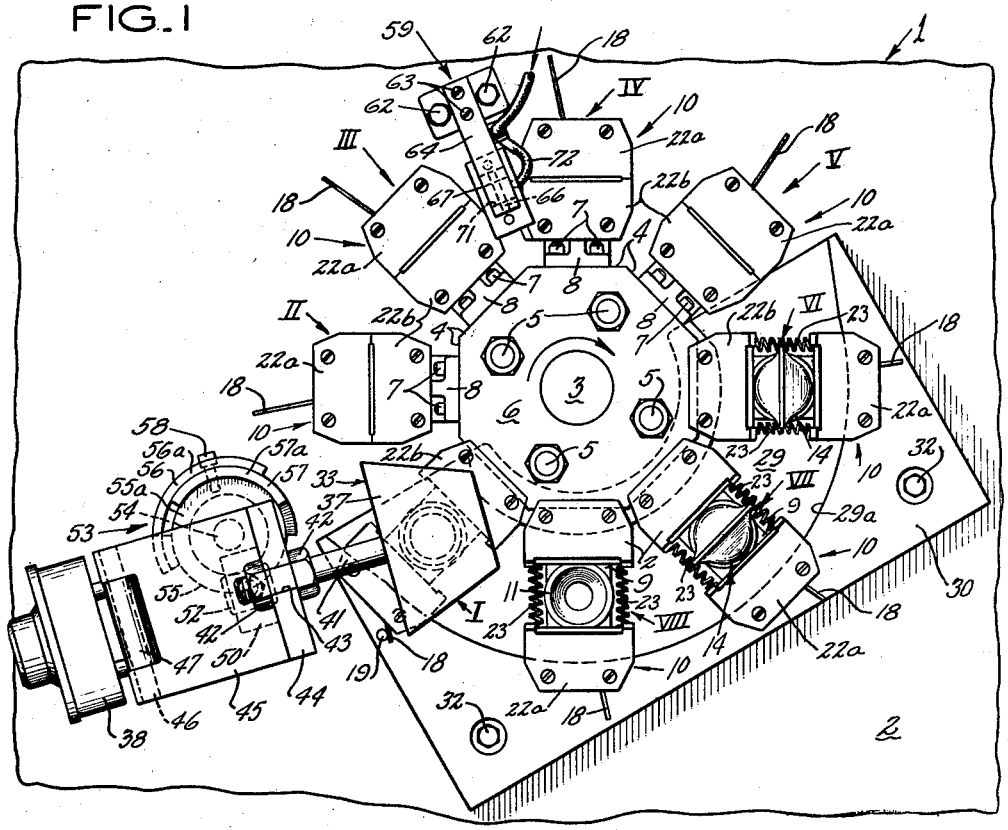
INVENTORS
DONNE I. MORRISON
DONALD F. ARMOUR
BY Bates + Willard
ATTORNEYS March 1, 1960 D. I. MORRISON ET AL 2,926,474
TUBE CLOSING MACHINE
Filed Jan. 29, 1954 2 Sheets-Sheet 2

INVENTORS
DONNE I. MORRISON
DONALD F. ARMOUR
BY Bates + Willard
ATTORNEYS

United States Patent Office 2,926,474
Patented Mar. 1, 1960

2,926,474

TUBE CLOSING MACHINE

Donne I. Morrison, Stonington, Conn., and Donald F. Armour, Westerly, R.I., assignors to Plax Corporation, West Hartford, Conn., a corporation of Delaware Application January 29, 1954, Serial No. 407,021

5 Claims. (Cl. 53—373)

The present invention relates to heat sealing portions of articles formed of thermoplastic resinous materials and more particularly for closing and trimming the ends of tubular containers of the type used for tooth pastes, shaving creams, cheese spreads, and the like, when the tubes are made of a thermoplastic material, such as polyethylene.

The invention contemplates a heat sealing machine which is simple in construction and efficient in operation and which can be produced on a practical and commercial scale at low cost.

Other and further objects and advantages of the invention will become apparent from the following description which is made with reference to the accompanying drawings, in which:

Figure 1 is a top plan view of apparatus which embodies the invention;

Fig. 2 is a front elevation view of the heating unit component of the apparatus shown in the left portion of Fig. 1;

Fig. 5 is a cross-sectional view taken on line 5—5 of Fig. 4 and showing details of gripping mechanism for releasably holding the neck of an inverted container;

Figure 3:
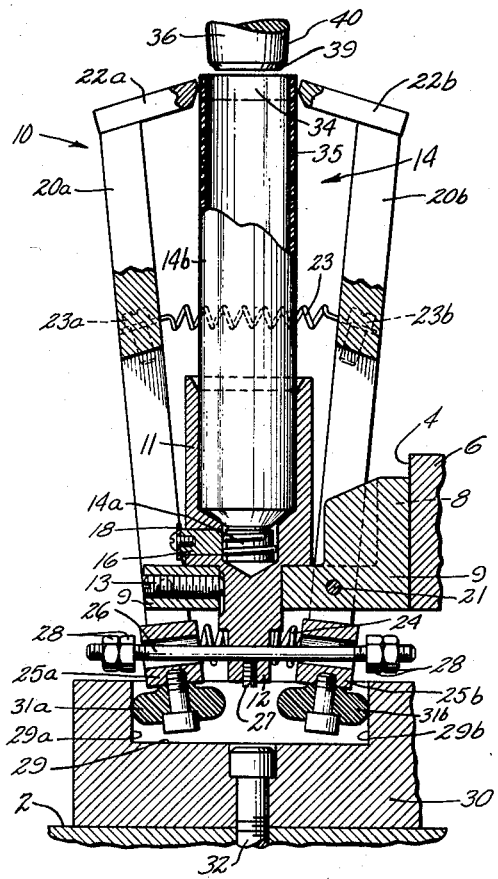
Fig. 3 is an enlarged elevational view of a pair of open clamping members, the lower portions of which are shown in cross-section as viewed generally from line 3—3 of Fig. 1.

Referring to the drawings and more particularly to Fig. 1, there is shown the horizontal top or table 2 of a cabinet or housing, generally designated 1, in which there is provided a conventional powered Geneva drive (not shown) for effecting step-by step clockwise rotation of a vertically disposed drive shaft 3 and a horizontally disposed turret 6 to which the shaft is secured, as by bolts 5, and a face plate (not shown).

In the illustrated embodiment, the turret 6 is an octagonal member having eight sides 4 to each of which is secured as by bolts 7, a flange 8 of a bracket or base member 9 of a clamping assembly, generally designated 10. While eight identical clamping assemblies 10 are provided, one on each side 4 of the octagonal turret 6, it will be understood that a lesser or greater number may be provided and the turret 6 suitably modified to carry the selected number at equally spaced intervals about the turret.

Referring more particularly to Figs. 3–6, the clamping assembly 10 includes a cup 11 having a depending portion 12 which is secured by set screw 13 in the bracket 9. The interior of the cup 11 is shaped to conformingly receive the neck 14a and adjacent portion of the body 14b of an inverted tubular container 14. In the embodiment illustrated, the container 14 is of the type used for tooth paste, shaving cream, unguents, and the like, and the interior of the cup 11 suitable contoured to conform therewith. However, it should be understood that the contour of the cup 11 may be appropriately modified so as to provide support for containers of other shapes. The cup 11 is slotted at 15 for a clamping lug 16 which is pivotally mounted therein by a pin 17. The lug 16 is arcuately shaped to conform generally to the container neck 14a and carries a leaf spring 18 which is engageable with a fixed pin 19 to resiliently clamp the container neck 14a between the lug 16 and the wall of the cup 11, as shown in Figs. 1 and 5.

The clamping assembly 10 further includes a pair of clamping members 20a, 20b, which are pivotally secured to the bracket plate 9 on spaced pins 21, 21.

The upper or jaw ends 22a, 22b of the clamping members 20a, 20b, are yieldably urged toward each other by springs 23 which are secured by screws 23a, 23b, in tension between the members 20a, 20b, intermediate the clamping jaw ends 22a, 22b, and the pins 21, and by springs 24 which are compressed between the lower ends 25a, 25b of the clamping members 20a, 20b.

Figure 4:
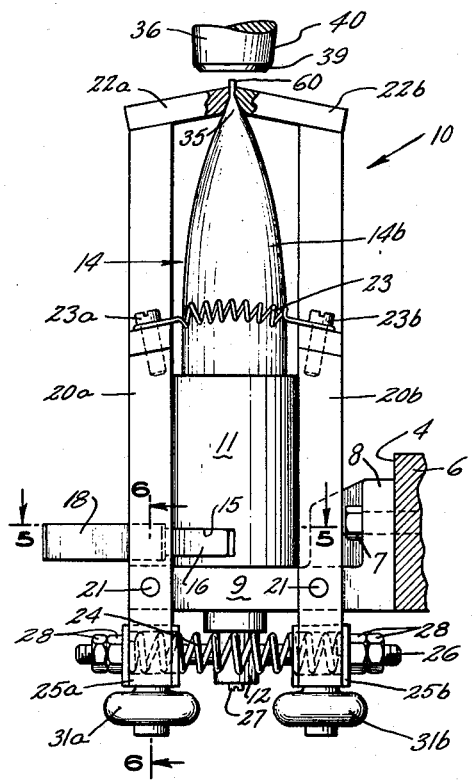
Fig. 4 is a view similar to Fig. 3 showing the clamping members in full.

Movement of the jaws 22a, 22b toward each other is adjustably limited individually so that the ends exert sufficient, but not excessive, sealing pressure on the container 14, as shown in Fig. 4.

In the illustrated embodiment, a rod 26, which extends through and is secured to the cup pin 12 by a set screw 27, a so extends through the clamping members 20a, 20b and has adjustable stop nuts 28 which limit the outward pivotal movement of each of the lower ends 25a, 25b of the clamping jaws.

Opening of the clamping jaws 22a, 22b against the force of the closing springs 23 and 24 is effected by a cam track 29 of a horizontal stationary cam plate 30. More particularly, the cam track 29 includes outer and inner cam walls 29a, 29b which respectively engage cam follower rollers 31a, 31b rotatably secured to the lower ends 25a, 25b, respectively, to cam open the jaws 22a, 22b, as shown in Fig. 3.

As shown in Fig. 1, the cam plate 30 is fastened by bolts 32 to the table 2 and it is to the cam plate 30 that the pin 19 is secured.

Heating of the upper end 14b of the inverted container 14 in the clamping assembly 10 preparatory to clamping and sealing the heat softened plastic with the clamping jaws 22a, 22b is effected by a heating device which generally is designated 33 in Figs. 1 and 2. Preferably the heat is applied directly to the internal surface 34 of the container 14 which is to be pressed into sealing engagement by the jaws 22a, 22b rather than supplying heat to the outside surface 35 of the container 14 and thence through the container wall to the inner surface 34.

More particularly, the heater 33 includes a hot plug 36 which is electrically or otherwise supplied with heat by a unit 37, the output of which is selectively determined by a thermostatic and rheostatic control unit 38.

As shown in Fig. 2, the lower end 39 of the heating plug 36 is sharply tapered for easy insertion in the open end of the inverted container 14. Above the abrupt taper 39, the plug is slightly tapered at 40 and is of a size to firmly fit the container surface 34 in good heat transfer engagement. If desirable, the plug 36 may be coated with a non-sticking resin film, such as polytrichloromonofluoroethylene.

Movement of the heating plug 36 into and out of the container 14 is effected in timed relation to the intermittent movement of the clamping assemblies 10. More particularly, the heating unit 37 from which the plug 36 depends is secured as shown in Fig. 2 at the outer ends of horizontal supporting posts or pins 41, the inner ends of which are adjustably secured by nuts 42 at a suitable elevation in a slotted way 43 of a vertical support 44 that is secured to the outer end of a generally horizontal lever 45 which is pivotally pinned at 46 to a fixed post bracket 47 on which the heat controller 38 is mounted.

Adjustably secured to the lower end of the support 44 as by means of bolts 48 and slotted way 49 is a cam follower 50 which is engaged by an adjustment screw 51 in the bar 45 with which to effect a fine adjustment of the follower 50 on the support 44. As shown in Fig. 2, the cam follower 50 includes a roller 52 which is supported by a generally horizontal face cam 53 which is secured to a vertical shaft 54. The drive within the housing 1 effects one complete rotation of the shaft 54 following each angular advancement of the turret 6 by the step-by-step rotation of the Geneva drive shaft 3 and before initiation of the next advancement of the turret.

The cam 53 includes a main cam plate 55 having an annular surface 55a which is adapted to support the roller 52 at an elevation corresponding to proper insertion of the heater plug 36 within the upper open end of the inverted container 14. In addition, the cam 53 includes a pair of arcuate members 56, 57 which are adjustably secured by a bolt 58 on the periphery of the main plate 55 and which have cam surfaces 56a and 57a that raise and lower the cam roller 52 and the heater plug 36 during a complete rotation of the cam shaft 54. It will be apparent that the cam 53 and follower 50 provide for lowering the heater plug 36 into heat transferring engagement with the container 14 for a selected time and for thereafter raising the plug 36 and sustaining it out of engagement with the container 14 before and during indexing of the turret 6.

While reciprocal movement of the plug 36 can be provided, the pivotal movement provided by the present embodiment is particularly suitable in that it provides a slight distortion of the engaged portion of the container 14 and a disruption of the engaged surface which improves its bonding character without noticeably altering the shape of the container 14.

Movement of the turret 6 to advance a clamping assembly 10 and its heated container 14 from the heating station I (Fig. 1) moves the declamping cam rollers 31a, 31b out of the restraining engagement of the cam track 29 whereupon the springs 23 and 24 close the clamping members 20a, 20b, the jaws 22a, 22b of which press and hold the heated end of the container 14 in sealed engagement (Fig. 4) while the plastic cools and sets in a firmly adhering bond during travel of the clamped assembly from station I to station V.

Figure 7:
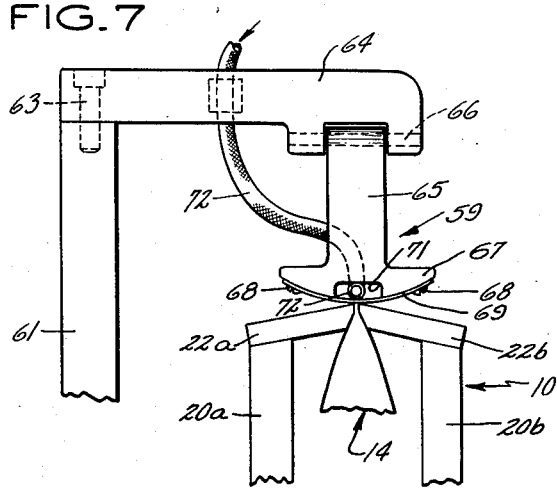
Fig. 7 is a fragmentary view of a trimmer component shown in the upper center portion of Fig. 1.
Figure 6:
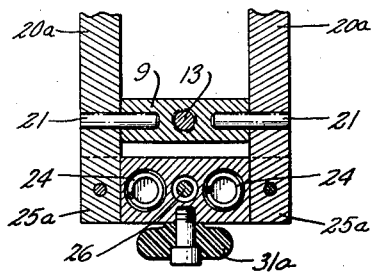
Fig. 6 is a cross-sectional view taken on line 6—6 of Fig. 4.

As shown in Figs. 1 and 7, a trimmer generally designated 59 is provided which automatically trims the excess plastic 60 (Fig. 4) that projects above the clamping jaws 22a, 22b as the clamping assembly 10 passes from station III to station IV. More particularly, the trimmer 59 includes an upstanding post 61 which is secured by bolts 62 to the table 2 and supports with screws 63 a horizontally projecting arm 64 to the outer end of which a cutter head 65 is pivotally hung by a pin 66. Secured to the curved under surface 67 of the freely hung head 65, as by screws 68, is a razor or similar cutting blade 69. The cutter head 65 has a limited free movement in the direction of travel of the underlying clamping assembly 10 over the jaws 22a, 22b of which the blade 69 slides (Fig. 7) so as to accommodate the shock of initial contact and thereafter cut the excess plastic 60 (Fig. 4) from the sealed plastic gripped between the jaws. As shown in Fig. 7, the head 65 is cut away at 71 above the blade 67 to accommodate the excess plastic which may be removed by an air stream from an air line 72.

After the clamped and sealed plastic has been cooled and set, the clamping jaws 22a, 22b are opened by engagement of the roller followers 31a, 31b with the cam track walls 29a, 29b, respectively. In the illustrated embodiment, the jaws 22a, 22b are opened between stations V and VI whereupon the sealed containers 14 may be manually or otherwise unloaded and the cup 11 reloaded at stations VI, VII and VIII preparatory to repeating the sealing operation with the machine.

Modifications of the invention will be apparent from the foregoing description of one embodiment which is illustrative rather than definitive of the invention, the scope of which is identified by the appended claims.

We claim:

1. Apparatus for heat sealing closed an open end of a thermoplastic tubular container which apparatus comprises a plurality of container holders, each of said holders being adapted to receive and support a container, means for moving said holders to successive stations including a first station, pivotal mounting means adjacent the path of movement of said holders through said first station, a heating plug, lever means supporting said plug and connected to said pivotal mounting means to swingably move said plug into and out of engagement with the inner peripheral surface of the open end of each container at said first station such that a disruption of the engaged surface occurs to improve the heating and subsequent sealing of the heated end, a pair of clamping jaws associated with each holder, means to close said jaws to pinch and hold closed the heated end of the tubular container at a second station, and means to open and hold open the clamping jaws while said holder is unloaded and reloaded at successive stations.

2. Apparatus for heat sealing closed an open end of a thermoplastic tubular container which apparatus comprises a turret mounted for step-by-step rotation about a vertical axis, a plurality of container holders equally spaced about the periphery of said turret, each of said holders being adapted to receive and support a container in a vertical position with the open end uppermost, a first station at which the step-by-step movement of the turret successively presents each of said holders, a heating plug, lever means mounting said plug to be swingable into and out of engagement with the inner peripheral surface of the upper open end of each container at said first station between step-by-step movement of the holders to said station, a pair of clamping jaws associated with each holder, said jaws being resiliently biased to pinch and hold closed therebetween the heated end of the tubular container, and cam means to open and hold open the clamping jaws while said clamping jaws are at said first station.

3. Apparatus for heat sealing closed an open end of a thermoplastic tubular container which apparatus comprises a turret mounted for step-by-step rotation about a vertical axis, a plurality of container holders equally spaced about the periphery of said turret, each of said holders being adapted to receive and support a container in a vertical position with the open end uppermost, a first station at which the step-by-step movement of the turret successively presents each of said holders, means resiliently gripping the container in the holder at said first station and releasing said container at subsequent station, a heating plug, lever means mounting said plug to be swingable into and out of engagement with the inner peripheral surface of the upper open end of each container at said first station between step-by-step movement of the holders successively to said station, a pair of clamping jaws associated with each holder, said jaws being resiliently biased to pinch and hold closed the heated end of the tubular container, and cam means to open and hold open the clamping jaws while said holder is unloaded and reloaded at subsequent stations.

4. Apparatus for heat sealing closed an open end of a thermoplastic tubular container which apparatus comprises a turret mounted for step-by-step rotation about a vertical axis, a plurality of container holders equally spaced about the periphery of said turret, each of said holders being adapted to receive and support a container in a vertical position with the open end uppermost, a first station at which the step-by-step movement of the turret successively presents each of said holders, a heating plug movable into and out of engagement with the inner peripheral surface of the upper open end of each container at said first station between step-by-step movement of the holders successively to said station, adjustment means for varying the time of initial and final engagement and for adjusting the length of engagement of the plug and container, means for adjusting the temperature of said plug, means for adjusting the travel of said plug into and out of said container, a pair of clamping jaws associated with each other, said jaws being resiliently biased to pinch and hold closed the heated end of the tubular container, and cam means to open and hold open the clamping jaws while said holder is unloaded and reloaded and while the container is heated.

5. Apparatus for heat sealing closed an open end of a thermoplastic tubular container which apparatus comprises a turret mounted for step-by-step rotation about a vertical axis, a plurality of container holders equally spaced about the periphery of said turret, each of said holders being adapted to receive and support a container in a vertical position with the open end uppermost, a first station at which the step-by-step movement of the turret successively presents each of said holders, a heating plug, lever means mounting said plug to be swingable into and out of engagement with the inner peripheral surface of the upper open end of each container at said first station between step-by-step movement of the holders successively to said station, a pair of clamping jaws associated with each holder, said jaws being resiliently biased to pinch and hold closed the heated end of the tubular container, means for trimming material from said closed end during travel between stations, and cam means to open and hold open the clamping jaws while said holder is unloaded and reloaded and while the container is heated.

References Cited in the file of this patent
UNITED STATES PATENTS

| | | |
|---|---|---|
| Re. 20,881 | Rambold | Oct. 11, 1938 |
| 1,889,193 | Craig | Nov. 29, 1932 |
| 2,106,739 | Harrison | Feb. 1, 1938 |
| 2,325,163 | Goodwin | July 27, 1943 |
| 2,390,120 | Peters | Dec. 4, 1945 |
| 2,551,476 | Vantlander | May 1, 1951 |
| 2,568,794 | Dieter | Sept. 25, 1951 |
| 2,669,815 | Zinn | Feb. 23, 1954 |
| 2,715,087 | Barradas | Aug. 9, 1955 |